March 18, 1930.  H. F. MAUREL  1,750,721
OVEN
Filed Jan. 27, 1928
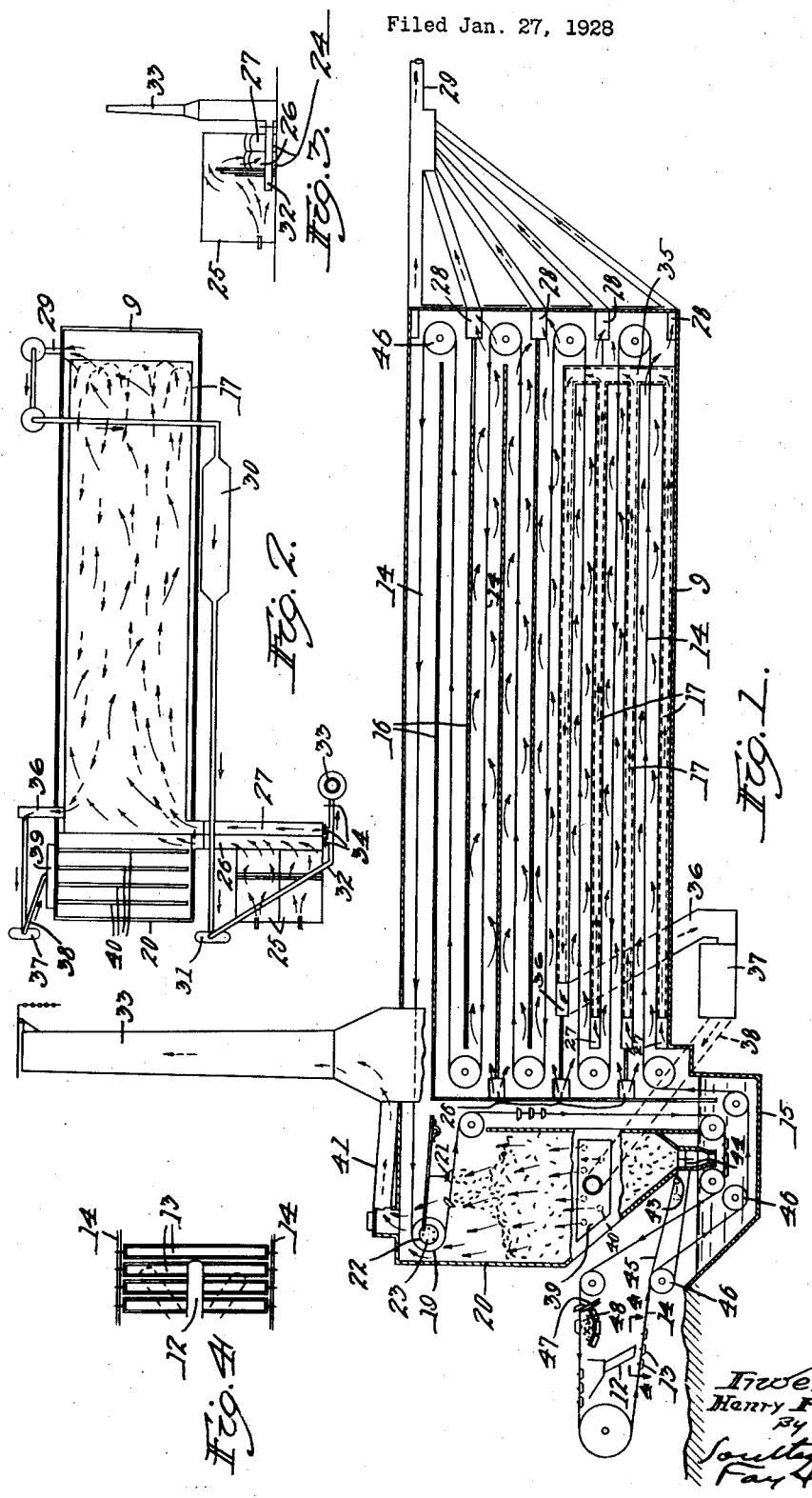
Inventor
Henry F. Maurel
By Attorneys
Southgate
Fay & Harley Patented Mar. 18, 1930

1,750,721

UNITED STATES PATENT OFFICE

HENRY F. MAUREL, OF PROVIDENCE, RHODE ISLAND, ASSIGNOR TO MAUREL INVESTMENT CORPORATION, A CORPORATION OF RHODE ISLAND

OVEN

Application filed January 27, 1928. Serial No. 250,047.

This invention relates to an oven capable of use for various purposes but especially designed for the baking of fuel briquettes.

The principal objects of the invention are to provide an oven in combination with a conveyor so arranged as to subject the briquettes, while traveling on the conveyor, to two different sources of heat and to regulate both temperatures at will; to provide for heating the oven by a furnace or furnaces, and by direct heat or by indirect heat, or both at will; to provide means whereby the heat entering the oven from the furnaces will be delivered into the oven under pressure with the blowers handling hot gases only at moderate temperatures; to utilize the blowers as exhausters also; to supply the heat to the briquettes as they pass through the oven in such a manner as to ensure a substantially even distribution of the heat and uniform treatment of the upper and lower layers; to provide for regulating the amount of heat introduced into the oven by controlling the temperature and by controlling the volume of heated gases entering the oven; to provide means whereby the briquettes can be introduced into the oven and discharged therefrom at the same end, thereby saving the wages of one attendant; to provide for regulating the temperature automatically if desired, by diverting the products of combustion in addition to controlling combustion; to provide a bin or hopper constituting a part of the oven and arranged to give the product an additional coking, baking or soaking period after leaving the conveyor without interfering with the continuous flow of the product and providing an increased capacity of the oven without increasing the length of the conveyor or oven, thus securing material economy; to provide means for utilizing the exhaust gases from the indirect heating system or from the direct heating system at will for the additional treatment of the product when desired while in the bin or hopper, or for utilizing in like manner the cold exhaust gases available from the condensing equipment of the operation to cool off the product when desired before discharging it from the oven; to provide a feeder at the bottom of the hopper synchronizing to discharge into each bucket of the conveyor passing out of the oven a quantity of material substantially equal to that which the same bucket carried to the oven, after the product has been through the said hopper; to provide means for permitting the regulation of the quantity discharged by this feeder; to provide an arrangement whereby the same liquid seal may be used for introducing the product and discharging it, whereby the liquid in this seal is kept heated by the outgoing conveyor and the product carried thereby so as to distribute this heat to the cold product passing into the oven and preliminarily heating it as well as quenching the outgoing product before it is delivered; to provide an improved arrangement for distributing the unbaked product on the conveyor in a uniform manner from end to end of the buckets, and to provide means whereby the baked product passing out of the oven may be dry-quenched if desired, instead of passing through the liquid seal, merely by lowering the level of the liquid seal and utilizing instead the inert exhaust gases from the condensers to cool off the product and form at the same time an air seal.

Other objects and advantages of the invention will appear hereinafter.

Reference is to be had to the accompanying drawings in which

Fig. 1 is a longitudinal sectional view of an oven constituting a preferred embodiment of this invention, some features being shown diagrammatically;

Fig. 2 is a plan of the oven and furnace;

Fig. 3 is a front view of the furnace, and

Fig. 4 is a plan showing the charging device as indicated by the line 4—4 in Fig. 1.

Although capable of many other uses, the oven 9 is particularly adaptable to the baking of fuel briquettes. The briquettes are dropped into a chute 12. The chute is arranged to sway back and forth to distribute the briquettes evenly from side to side of the baskets 13 which are pivotally mounted on endless conveyor chains 14.

This conveyor immediately passes down into a tank 15 under the liquid therein, and up out of the same into the oven 9. This oven is of air tight construction adequately insulated. There the conveyor passes back and forth through the oven a plurality of times always going from the bottom toward the top. Between the flights of the conveyor there are a series of horizontal solid metal partitions 16 and hollow partitions 17 which divide the oven into compartments. Said partitions extend from one end of the oven almost to the other and are arranged to alternate in this respect, thus forcing the heated gases to traverse the length of the oven before they escape into another compartment or into the discharge flues. The conveyor also passes back and forth the length of the oven entering at the bottom and leaving at the top.

Rotating sprockets are located at each end to support the conveyor. The upper strand of the conveyor passes farther along the oven than the others and over a sprocket 19 and then back part way and down vertically to the water seal 15. Here it passes down through the water or whatever liquid is used and then up out of the furnace.

The oven 9 is heated by furnaces 25 adapted to be operated with solid or liquid or gas fuel as desired. In the present case the furnace or furnaces deliver the products of combustion to the oven for direct heating through flues 26 and also deliver hot gases to the furnace for indirect heating through flues 27. The flues 26 deliver the products of combustion at will, at one or at several points at one end of the oven entering at one side and on both sides of the partitions adjacent thereto when direct heat is desired. Thus they direct a current of hot gases, both above and below each of the several partitions. These gases pass to the opposite end of the oven where they are discharged through flues 28 and to a pipe 29 through a condenser 30, if so desired. They are drawn through this course by a blower 31 which forces the now cooled gases back through a pipe 32 and up a stack 33. Gates or dampers 34 are employed so that any proportion of these gases can, if desired, be circulated again through either one of the flues 26 or 27 under a forced draft from the blower 31.

The flues 26 and 27 serve as ducts for the products of combustion from the furnaces and at the same time as mixing chambers to control their temperatures more accurately by dilution with cooled condenser gases delivered by exhauster 31, the dilution being controlled by dampers 34. Flues 26 and 27 may be equipped with small doors or shutters 24, preferably close to the cool gas intakes, to control sucking in air, for oxidizing or to permit partial combustion of the gases generated inside of the oven, if desired. The flues 27 open into the hollow partitions 17 and go from there to an end passage 35 and then back through the upper one of these partitions. They are discharged by means of a flue 36 to a blower 37 which draws them out and forces them through a pipe 38 into a header 39 which communicates with cross pipes 40 located in the hopper 20 for the purpose of heating the material in this hopper. Said hopper may be lined inside with refractories and insulation and the conveying equipment above can be likewise protected by a shield underneath, if the temperatures desired are high enough to require it. The hot gases are forced out of these pipes, which are perforated along the top and bottom and sides, if desired, right into the mass of material in this hopper. It will be understood of course that the products of combustion taken directly from the furnace could be directed into this header if desired, but I have preferred the form shown. This hopper is provided with an outlet 41 for the gases which can be disposed of, through the stack 33 or diverted for further use through condensing equipment if desired by exhauster 31 or by an auxiliary of same. The conveyor on its passage back from the sprocket 19 extends through or over the hopper 20 and the buckets or baskets are wrong side up at this point and are struck upon by a hammer 21. This hammer is operated from the power in synchronism with the travel of the conveyor, so it is adapted to give a single blow to the bottom of each basket as the basket passes under it for the purpose of discharging all particles of material therefrom into this hopper. This hammer is pivotally arranged and operated by a rotary wheel 22 on the shaft of the sprocket 19 so as to move in synchronism with the conveyor. This wheel has pins 23 for engaging the hammer as the wheel rotates causing the blows to be delivered just as the baskets or buckets reach an inverted position below it.

It will be seen that the baked briquettes are discharged into this hopper and slide down in it, being heated by the hot gases passing into it through the perforated pipes 40. The bottom of the hopper is provided with a gate 43 adapted to be operated manually and with a star feeder 44 which is shown as being driven by a chain 45 from one of the guide sprockets 46 of the conveyor. This star feeder, therefore, is arranged to operate in synchronism with the conveyor and it is so timed as to dump a charge into each of the empty buckets passing under it in the liquid seal when the basket gets to a central position under the discharge. It is provided with a clutch to regulate the quantity of the product in the hopper, that is, to start it or stop it according to the level desired in the hopper. The baskets now being filled pass out of the liquid seal and up to a convenient point where they are operated upon by a cam 47 which inverts them to deliver the product into a transverse conveyor 48 which carries them away to cars or storage.

It will be seen therefore that the gases both for producing direct and indirect heat are introduced into the oven at one side where they naturally flow across the oven and back again as indicated by the arrows in Fig. 2 to provide a comparatively uniform heat all the way across. The direct products of combustion pass through the oven longitudinally in contact with the briquettes contained in the baskets on the conveyor and then are drawn out under suction and forced under pressure either back into the oven or up to the stack.

It will also be seen that the indirect heat in the form of hot gases passes into the oven in a similar way but is confined in the hollow partitions and moves through the oven and then back again and is drawn under suction and forced into the header 39 to heat the briquettes in the hopper. The heat is delivered to the oven under pressure and yet the blowers handle gases only at moderate temperatures. The blowers serve not only as blowers but as exhausters as indicated above.

The product can be baked continuously either by direct heat or indirect heat or by both, and with any desired proportion of each, at any stage of the baking operation. The temperature of the oven is controlled and regulated during the entire baking operation, either by controlling the temperature of the gases entering the oven or by controlling the volume of the heated gases entering it. The radiated heat, or heated gases of combustion, are alternately drawn upwards and downwards through the product so as to insure uniform heat in the bottom and top.

The hopper 20 is an important feature as it is incorporated in the oven and forms a part of it. It gives the product another additional baking or soaking without interfering with the continuous flow of the product. It results in a greatly increased capacity for the length of the oven and conveyor and saves in capital investment. By utilizing the exhaust gases from the indirect system, or the direct if desired, additional baking of the product is secured or the cold exhaust gases available from the condensing equipment can be used to cool off the oven if desired. It will be seen that the conveyor is used to carry the briquettes or the like throughout the main part of the oven back and forth a number of times and then is emptied and finally filled again at the bottom of the hopper ready for the product to be discharged from the oven. The intake and discharge are both located at the same end thereby eliminating one attendant.

A single liquid seal is employed for receiving the untreated product and discharging the treated product. In this way the heat from the latter is utilized to heat up the liquid seal and transmit part of this heat for the preliminary heating of this product before entering the oven, thereby having two efficient purposes. The product is more thoroughly cooled before it is discharged and is given a preliminary heating before it enters the oven without adding to the expense of these two operations, either as to equipment or fuel.

By having the discharge side of the conveyor located over the intake side in the liquid seal, the product can be discharged in a dry condition if preferred by simply lowering the level of the liquid in this seal below the upper strand of the conveyor therein. In this case the exhaust gases from the condensers may be utilized to cool off the product and form an air seal above the liquid seal. The material is distributed along the whole length of the long baskets by the oscillating discharge chute in charging the conveyor.

Although I have illustrated and described only one form of the invention I am aware of the fact that modifications can be made therein by any person skilled in the art without departing from the scope of the invention as expressed in the claims. Therefore, I do not wish to be limited to all the details of construction herein shown and described, but what I do claim is:

1. In an oven for baking purposes, the combination with an air-tight casing, of a conveyor therein having loading and discharge points outside the oven, and a single liquid seal through which the conveyor enters and leaves the oven, the discharge strand of the conveyor being located above the feed strand, whereby the water can be lowered to permit the discharge to take place in a dry state without interfering with the liquid seal for the feed strand.

2. In an oven for baking fuel briquettes, the combination with an air-tight casing, of a conveyor therein having loading and discharge points outside the oven, and a single liquid seal through which the conveyor enters and leaves the oven, the feed and discharge ends of the conveyor being located horizontally one over the other and adjacent to each other on the same side of the oven.

3. The combination with a baking oven for fuel briquettes, a conveyor passing through the oven back and forth a plurality of times, the oven having partitions between each two strands of the conveyor, means for driving the conveyor, and baskets mounted upon the conveyor for carrying the material to be acted upon undisturbed throughout its course through the oven, of a furnace arranged to discharge its products of combustion into the oven at the side between the partitions, some of the partitions being hollow, means for circulating hot gases through the hollow partitions, and blowers arranged to draw hot gases through the oven and discharge them under pressure.

4. In an oven for baking briquettes and the like the combination with a conveyor passing back and forth through the oven and entering the oven from one end and discharging from the same end, and partitions extending through the oven, of means for introducing heated products of combustion between said partitions at one side and one end so that they will pass across the conveyor and partitions to flow back toward the intake side and thus heat the briquettes evenly over the entire surface, means for discharging the products of combustion at the opposite end, a blower for drawing the products of combustion out and then forcing them to be discharged, some of said partitions being hollow, means for directing hot gases into the hollow partitions, and a blower for drawing the exhaust gases out from the hollow partitions and discharging them.

5. In an oven for baking briquettes and the like, the combination with the oven, of a series of horizontal partitions therein, an endless conveyor having means for carrying the briquettes back and forth between said partitions from the bottom of the oven upwardly, the upper strand of the conveyor extending from the oven beyond the partitions, a bin under said extension for receiving the briquettes from the conveyor, a series of perforated pipes in the bin, means for heating the oven, and means for drawing the heating medium out of the oven and directing it into said pipes to discharge it through the material in the bin and add to the baking action.

6. In an oven for baking briquettes and the like, the combination with the oven, of an endless conveyor having baskets for carrying the briquettes back and forth in the oven, the discharge strand of the conveyor extending in the oven beyond the main part of the conveyer, a bin located within the oven under said strand for receiving the briquettes from the conveyor, said conveyor having a return strand carrying the baskets bottom side up over the bin, a series of perforated pipes in the bin, means for conducting the heating medium out of the oven into said pipes, the conveyor passing down alongside the bin in the oven and having an outlet and a rotatable star feeder timed in synchronism with the movement of the conveyor for delivering a charge of briquette material on said horizontal strand of the conveyor each time a basket passes under said outlet.

7. In an oven for baking briquettes and the like, the combination with the oven, of an endless conveyor having baskets for carrying the briquettes, a bin located within the oven for receiving the briquettes from the conveyor, said conveyor having a return strand carrying the baskets bottom side up over the bin, the conveyor passing down alongside the bin in the oven and having a horizontal strand below the bin, the bin having an outlet and a rotatable star feeder timed in synchronism with the movement of the conveyor for delivering a charge of briquette material on said horizontal strand of the conveyor each time a basket passes under said outlet.

8. The combination with an oven, of an endless conveyor movable therein having baskets for supporting briquettes to be baked, means for heating the oven to bake the briquettes, said conveyor having its discharge strand at the top, a bin located within the oven at the end thereof, the discharge strand of the conveyor extending across the top of the bin and back below said top strand to bring the baskets bottom side up, means for discharging the briquettes from the baskets when bottom side up into the bin, a series of pipes in the bin having perforations, means for directing the exhaust heat from the oven into said pipes to further bake the material in the bin, said conveyor passing down within the oven and having a horizontal strand below the bin, the bin having an outlet over the horizontal strand, and means in synchronism with the movement of the conveyor for discharging on to said conveyor as each basket passes said outlet.

9. The combination with an oven, of an endless conveyor movable therein having baskets for supporting briquettes to be baked, said conveyor having its discharge strand at the top, a bin, the discharge strand of the conveyor extending across the top of the bin and back below said top strand to bring the baskets bottom side up, means for discharging the briquettes from the baskets when bottom side up into the bin, said conveyor passing down and having a horizontal strand below the bin, the bin having an outlet above the horizontal strand, and means in synchronism with the movement of the conveyor for discharging a basket full of material each time a basket passes said outlet.

10. The combination of an endless conveyor having baskets for supporting briquettes, said conveyor having its discharge strand at the top, a bin, the discharge strand of the conveyor extending across the top of the bin and back below said top strand to bring the baskets bottom side up, means for discharging the briquettes from the baskets when bottom side up into the bin, said conveyor passing down and having a strand below the bin, the bin having an outlet above the horizontal strand, and means for discharging material into the baskets.

11. In an oven for baking briquettes and the like, the combination with the oven, of a series of horizontal partitions therein, an endless conveyor having means for carrying the briquettes back and forth between said partitions from the bottom of the oven upwardly, the upper strand of the conveyor extending from the oven beyond the partitions, a bin located within the oven under said extension for receiving the briquettes from the conveyor, a series of perforated pipes in the bin, means for heating the oven, and means for admitting air into the bin, under control, to permit combustion of the gases therein generated and thus contribute heat for this part of the operation.

In testimony whereof I have hereunto affixed my signature.

HENRY F. MAUREL.